(12) United States Patent
Ulrich (10) Patent No.: US 6,236,014 B1
(45) Date of Patent: May 22, 2001

(54) METHOD AND APPARATUS FOR PROVIDING WELDING/PLASMA POWER

(75) Inventor: James F. Ulrich, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/466,955

(22) Filed: Dec. 20, 1999

(51) Int. Cl.$^7$ .................................................. B23K 10/00
(52) U.S. Cl. ............................. 219/121.57; 219/121.54; 219/121.45; 219/130.21; 363/142
(58) Field of Search ..................... 219/121.54, 121.39, 219/121.57, 121.49, 121.46, 130.1, 130.4, 130.21; 363/142, 143

(56) References Cited

U.S. PATENT DOCUMENTS

| | | | |
|---|---|---|---|
| 4,943,699 | * 7/1990 | Thommes | 219/121.57 |
| 5,036,176 | * 7/1991 | Yamaguchi et al. | 219/121.48 |
| 5,601,741 | 2/1997 | Thommes. | |
| 6,130,398 | * 10/2000 | Schneider et al. | 219/121.39 |

* cited by examiner

Primary Examiner—Mark Paschall
(74) Attorney, Agent, or Firm—Joseph W. Byrne (57) ABSTRACT

A method and apparatus for providing welding/plasma power is disclosed. The welding/plasma power source includes an input stage, an output stage, and an energy storage device such as a capacitor. The input stage is configured to receive an ac input signal and to rectify the ac input signal to provide a rectified intermediate signal. The input stage is further configured to provide a dc voltage signal across a dc bus. The output stage is disposed to receive the dc voltage signal and is configured to provide an available output power signal suitable for welding, plasma cutting and induction heating applications. The energy storage device is connected to provide sufficient stored energy to the dc bus to allow the welding/plasma power source to run off of a generator.

40 Claims, 2 Drawing Sheets

METHOD AND APPARATUS FOR PROVIDING WELDING/PLASMA POWER

FIELD OF THE INVENTION

This invention generally relates to power sources. More specifically, this invention relates to power sources employed in arc welding, plasma cutting and induction heating applications.

BACKGROUND OF THE INVENTION

Welding power sources typically convert a power input to a necessary or desirable power output tailored for a specific application. Welding power source and welding/plasma power source, as used herein, include power sources employed in welding, plasma cutting and/or induction heating. Welding (and cutting and heating) power sources typically receive an alternating current (ac) input signal and provide a high current output power signal. The input signal is typically a sinusoidal line voltage signal obtained from a utility source.

There are many types of welding/plasma power sources that provide output power suitable for welding, cutting and heating. Suitable prior art welding/plasma power sources include phase control power sources, converters, (for example, a series resonant converter delivers a sinusoidal output) and inverters. Converter, as used herein, includes a power circuit that receives or provides an ac or dc signal, and converts it to the other of an ac or dc signal, or to a different frequency. Inverter, as used herein, includes a power circuit that receives or provides a dc bus signal that is inverted to be an ac signal.

Generally speaking, an inverter-type power source receives the sinusoidal line input signal from the utility source, rectifies the sinusoidal line input signal, converts the rectified signal into a dc bus signal having a controllable voltage magnitude, and inverts the dc bus signal to provide an ac output. The ac output is rectified to provide dc welding or cutting output power. Often, the voltage magnitude of the dc bus voltage is greater than the peak voltage of the rectified input signal in these inverter-type power sources.

Inverter power sources suitable for welding, cutting and heating include boost, buck and boost-buck power sources, all of which are well known in the art. One such welding/plasma power source is described in U.S. Pat. No. 5,601,741, incorporated herein by reference.

Converters and inverters often include an energy storage device to deliver energy to the dc bus. Stored energy is used to maintain the voltage magnitude of the dc bus signal at a desired level during operation of the welding/plasma power source. The energy provided to a power source must be equal (over time) to the energy used (output energy plus losses). Generally, the power in equals the power used, but an electrical transient, such as that caused by a decrease in power in or an increase in power used may, for very short periods of time, result in more power being used than provided. Energy stored by the energy storage device is used to temporarily make up the difference between energy provided and energy used. The energy "shortfall" is generally for a short period of time because power from a utility source provided to the welding/plasma power source is able to quickly (on the order of one cycle, e.g.) change to the needed level. Generally, welding/plasma power sources have been designed using a dc bus capacitor as the energy storage device. The dc bus capacitor generally has as small a capacitance as possible to save on costs, but large enough to provide sufficient energy for the very short transients.

The power source described in U.S. Pat. No. 5,601,741, which receives its input signal from a utility source, has a dc bus capacitor C3/C7 as the energy storage device. This capacitor is capable of storing approximately 1.37(P)(T) joules of energy where P is the available output power of the welding/plasma power source in watts and T is the period of the ac input signal in seconds (for a 60 Hz input signal, T is approximately equal to 16.67 milliseconds). The amount of energy stored by the dc bus capacitor, and therefore available to the dc bus, is proportional to the size (capacitance) of the capacitor. This prior art welding/plasma power source has a capacitance of 400 microfarads (C3 and C7, which are connected in series, individually each have a capacitance of 800 microfarads), or approximately $2.75(P)(T)/(V^2)$ farads where V is the magnitude of the dc bus voltage in volts.

However, welding/plasma power sources can also receive their ac input signal from a generator source. Unlike utility sources which are capable of quickly increasing the power in response to the demands of a single welding/plasma power source, generator sources are typically limited in the amount of power they are capable of providing to a welding/plasma power source and in how fast they can react to increased demands for more power. Generator sources may also experience, in response to electrical transients and/or sudden increases in power used (e.g during periods of heavy loading), mechanical transients that are longer in duration than electrical transients.

These limitations, which are not present with utility sources, can reduce the amount of output power that is available from the welding/plasma power source when it is run off of a generator source. The degradation in output power can be as much as 75 percent. Therefore, it is desirable to have a welding/plasma power source that, when run off of a generator source, can provide at least 75 percent of the power that it is capable of providing when run off of a utility source.

Utility source, as used herein, includes sources for which loading by the welding/plasma power source is insignificant or negligible during normal operation of the welding/plasma power source. Generator source, as used herein, includes sources for which loading by the welding/plasma power source is not insignificant or negligible during normal operation of the welding/plasma power source.

It is common for a welding/plasma power source, when powered by a generator source, to place a heavy load on the generator source. This is especially true in plasma cutting applications where the plasma cutter draws a continuous high current output during the plasma cutting operation. In these heavy loading situations, the generator may temporarily slow down (e.g mechanical transient) and not be capable of providing adequate input power to the plasma cutter throughout the entire cutting operation. The voltage magnitude on the dc bus can dip or sag as a result. Without sufficient stored energy available to maintain the voltage magnitude of the dc bus at the desired level during these heavy loading periods, the available plasma cutting output power will be inadequate to maintain a sufficient arc during cutting (or welding or heating).

Recent advances in power factor correction circuitry has allowed welding/plasma power sources to operate much more efficiently than in the past. Power factors of 0.99 are now typical. As a result, less input power to the welding/plasma power source is needed to obtain a given output power. This means that smaller generator sources (e.g. having output power ratings approaching the output power rating of the welding/plasma power source) theoretically can be used to run the welding/plasma power source.

However, although the rated output power from these smaller generator sources may theoretically be adequate, the actual output power from these smaller generator sources during heavy loading may not be adequate for certain applications such as plasma cutting. Furthermore, heavily loading these smaller generators can exacerbate the problems related to mechanical transients.

Prior art energy storage devices are capable of maintaining the voltage magnitude of the dc bus signal at an adequate level when the welding/plasma power source is powered by a utility source. These energy storage devices are not capable, however, of maintaining the voltage magnitude of the dc bus voltage at an adequate level when the welding/plasma power source is powered by a generator source which is heavily loaded such as in plasma cutting applications. Therefore, it is desirable to have an energy storage device that is capable of storing sufficient energy to maintain the magnitude of the dc bus voltage at an adequate level during heavy loading of the generator source.

SUMMARY OF THE PRESENT INVENTION

According to a first aspect of the invention, a welding/plasma power source includes an input stage, an output stage, and a bus capacitor. The input stage is configured to receive an ac input signal having a period of T seconds and to rectify the ac input signal to provide a rectified intermediate signal having a peak voltage. The input stage is also configured to provide a dc voltage signal having a voltage of V volts across a dc bus. V is greater than the peak voltage of the rectified intermediate signal in this embodiment. The output stage is disposed to receive the dc voltage signal and is configured to provide an available output power signal having a power of P watts. The bus capacitor is connected across the dc bus and has a capacitance of at least $(3PT)/(V^2)$ farads.

The bus capacitor has a capacitance of at least $(4PT)/(V^2)$ farads in one alternative embodiment and at least $(5PT)/(V^2)$ farads in a second alternative embodiment.

The input stage includes an input rectifier configured to receive the ac input signal in one embodiment. The input stage also includes a converter configured to provide the dc voltage signal in another alternative embodiment and the converter is a boost converter in one embodiment and a buck converter in another embodiment.

The input stage includes a converter configured to provide the dc voltage signal in yet another embodiment.

The output stage includes an inverter disposed to receive the dc voltage signal in one embodiment and the inverter is a pulse width modulating inverter in a second embodiment. The output stage further includes an output transformer or an output rectifier configured to provide the available output power signal in various alternative embodiments.

The output stage includes an output rectifier configured to provide the available output power signal in yet another embodiment.

According to a second aspect of the invention, a welding/plasma power source includes an input stage, an output stage, and an energy storage device. The input stage is configured to receive an ac input signal having a period of T seconds and to rectify the ac input signal to provide a rectified intermediate signal having a peak voltage. The input stage is further configured to provide a dc voltage signal having a voltage of V volts across a dc bus. V is greater than the peak voltage of the rectified intermediate signal in this embodiment. The output stage is disposed to receive the dc voltage signal and is configured to provide an available output power signal having a power of P watts. The energy storage device is connected to provide stored energy to the dc bus and can store energy of at least $(1.5)(PT)$ joules.

The energy storage device can store at least $(2)(PT)$ joules in one alternative embodiment and at least $(2.5)(PT)$ joules in another alternative embodiment.

According to a third aspect of the invention, a welding/plasma power source includes an input stage, an output stage, and a bus capacitor. The input stage is configured to receive an ac input signal and to rectify the ac input signal to provide a rectified intermediate signal having a peak voltage. The input stage is further configured to provide a dc voltage signal having a voltage of V volts across a dc bus. V is greater than the peak voltage of the rectified intermediate signal in this embodiment. The output stage is disposed to receive the dc voltage signal and is configured to provide an available output power signal. The bus capacitor is connected across the dc bus and has a capacitance of at least 438 microfarads.

The bus capacitor has a capacitance of at least 500 microfarads, at least 583 microfarads, and at least 729 microfarads in various alternative embodiments.

According to a fourth aspect of the invention, a welding/plasma power source includes an input stage and an output stage. The input stage is configured to receive an ac input signal from a utility source and a generator and is also configured to provide a dc bus signal. The output stage is disposed to receive the dc bus signal and configured to provide an available output power. The available output power has a first value when the ac input signal is from the utility source and a second value when the ac input signal is from the generator source. The second value is at least seventy-five percent of the first value.

The second value is at least ninety percent of the first value in one alternative embodiment and at least ninety-five percent in a second embodiment.

According to a fifth aspect of the invention, a welding/plasma power source includes an input stage, an output stage, and an energy storage device. The input stage is configured to receive an ac input signal and to rectify the ac input signal to provide a rectified intermediate signal having a peak voltage. The input stage is further configured to provide a dc voltage signal having a voltage of V volts across a dc bus. V is greater than the peak voltage of the rectified intermediate signal. The output stage is disposed to receive the dc voltage signal and is configured to provide an available output power signal. The energy storage device is connected to provide stored energy to the dc bus and can store sufficient energy to maintain the available output power signal through the duration of mechanical transients.

According to a sixth aspect of the invention, a welding/plasma power source includes a generator source, an input stage, an output stage, and an energy storage device. The generator source is configured to provide an ac input signal having at least one mechanical transient. The input stage is configured to receive the ac input signal and to rectify the ac input signal to provide a rectified intermediate signal having a peak voltage. The input stage is further configured to provide a dc voltage signal having a voltage of V volts across a dc bus. V is greater than the peak voltage of the rectified intermediate signal in this embodiment. The output stage is disposed to receive the dc voltage signal and is configured to provide an available output power signal. The energy storage device is connected to provide stored energy to the dc bus and can store sufficient energy to maintain the available output power signal through the duration of the mechanical transients.

According to a seventh aspect of the invention, a method of providing welding/plasma power includes receiving an ac input signal having a period of T seconds, rectifying the ac input signal to provide a rectified intermediate signal having a peak voltage, providing a dc voltage signal having a voltage of V volts across a dc bus, receiving the dc voltage signal, providing an available output power signal having a power of P watts, and providing a capacitance of at least $(3PT)/(V^2)$ farads across the dc bus. V is greater than the peak voltage of the rectified intermediate signal in this embodiment.

According to an eighth aspect of the invention, a method of providing welding/plasma power includes receiving an ac input signal having a period of T seconds, rectifying the ac input signal to provide a rectified intermediate signal having a peak voltage, providing a dc voltage signal having a voltage of V volts across a dc bus, receiving the dc voltage signal, providing an available output power signal having a power of P watts, and providing stored energy to the dc bus from an energy storage device capable of storing at least $(1.5)(PT)$ joules of energy. V is greater than the peak voltage of the rectified intermediate signal in this embodiment.

According to a ninth aspect of the invention, a method of providing welding/plasma power includes receiving an ac input signal, rectifying the ac input signal to provide a rectified intermediate signal having a peak voltage, providing a dc voltage signal having a voltage of V volts across a dc bus, receiving the dc voltage signal, providing an available output power signal, and providing capacitance of at least 438 microfarads across the dc bus. V is greater than the peak voltage of the rectified intermediate signal in this embodiment.

According to a tenth aspect of the invention, a method of providing welding/plasma power includes receiving an ac input signal from at least one of a utility source and a generator source, providing a dc bus signal, receiving the dc bus signal, and providing an available output power. The available output power has a first value when the ac input signal is from the utility source and a second value when the ac input signal is from the generator source. The second value is at least seventy-five percent of the first value in this embodiment.

According to an eleventh aspect of the invention, a method of providing welding/plasma power includes receiving an ac input signal, rectifying the ac input signal to provide a rectified intermediate signal having a peak voltage, providing a dc voltage signal having a voltage of V volts across a dc bus, receiving the dc voltage signal, providing an available output power signal, and providing stored energy to the dc bus from an energy storage device capable of storing sufficient energy to maintain the available output power signal through the duration of mechanical transients. V is greater than the peak voltage of the rectified intermediate signal in this embodiment.

According to a twelfth aspect of the invention, a method of providing welding/plasma power includes providing an ac input signal from a generator source having at least one mechanical transient, receiving the ac input signal, rectifying the ac input signal to provide a rectified intermediate signal having a peak voltage, providing a dc voltage signal having a voltage of V volts across a dc bus, receiving the dc voltage signal, providing an available output power signal, and providing stored energy to the dc bus from an energy storage device capable of storing sufficient energy to maintain the available output power signal through the duration of the mechanical transients. V is greater than the peak voltage of the rectified intermediate signal in this embodiment.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding/plasma power source configuration it should be understood at the outset that the present invention can be implemented with other welding/plasma power source configurations, including boost converters, buck converters and inverters, boost-buck converters and inverters, and phase controlled power sources.

Generally, the present invention provides a welding/plasma power source that is capable of running off a generator source (as well as a utility source). An energy storage device, such as a capacitor in the preferred embodiment, is disposed to deliver energy to the dc bus. The energy storage capacity of the energy storage device is sufficient to allow for operation of the welding/plasma power source during heavy loading of the generator source and/or when electrical and mechanical input power transients are likely to occur.

While the preferred embodiment of the present invention will be illustrated with reference to a capacitor as the energy storage device, the present invention is not limited to a capacitor as the energy storage device. Energy storage device, as used herein, includes devices capable of storing energy and capable of delivering the stored energy to the dc bus such as a capacitor, an inductor or other device.

Figure 1:
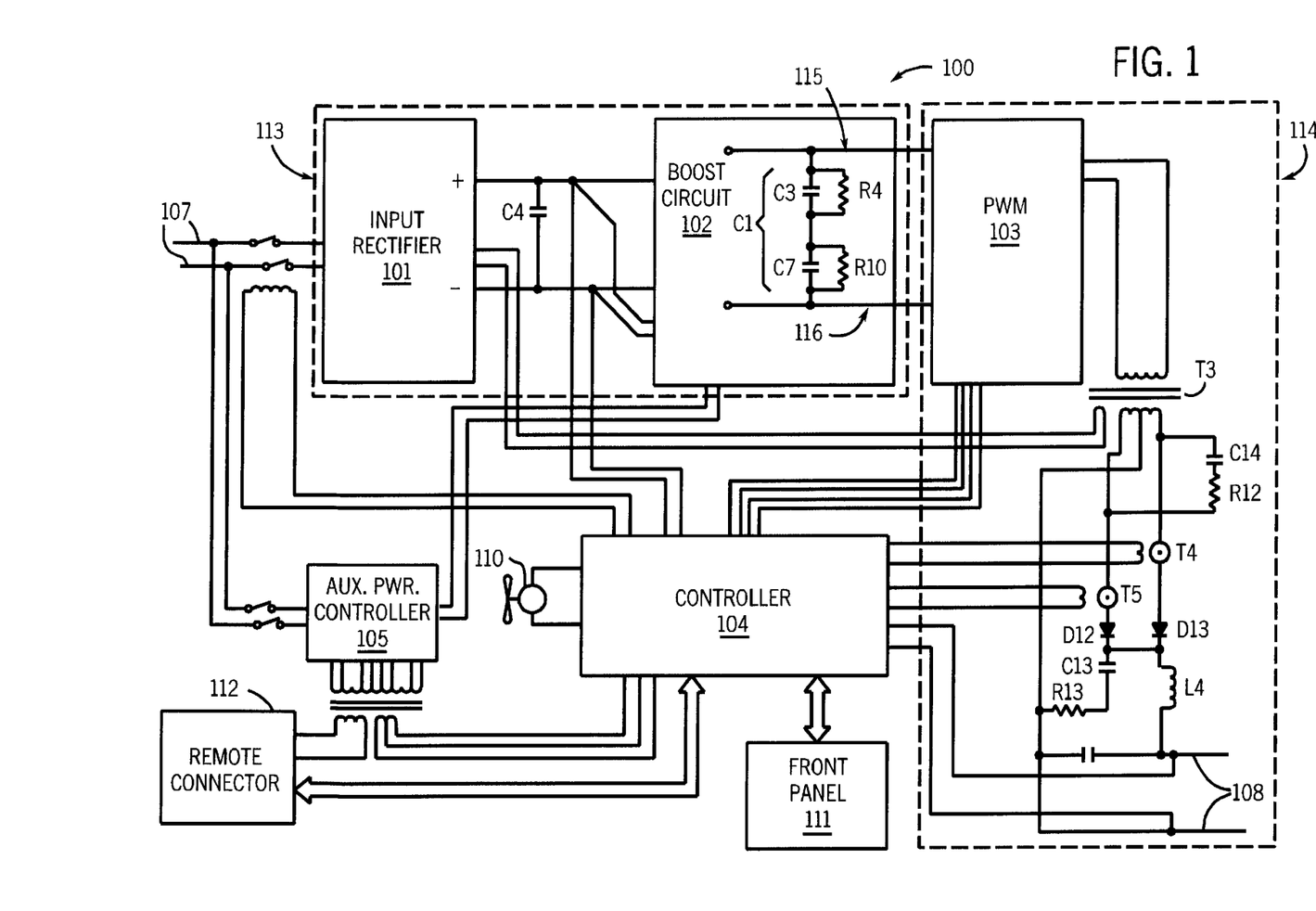
FIG. 1 is a block diagram of the preferred embodiment of the present invention.

Referring now to FIG. 1, the welding/plasma power source 100 of the preferred embodiment includes an input stage 113 and an output stage 114. Input stage 113 in the preferred embodiment includes a rectifier 101, a capacitor C4, and a boost circuit 102. Output stage 114 in the preferred embodiment includes a pulse-width modulator (PWM) 103, an output transformer T3, an output inductor L4, feedback current transformers T4 and T5, feedback capacitors and resistors C13, C14, R12 and R13, and output diodes D12 and D13 to provide a welding (or cutting or heating) output on output terminals 108. Welding/plasma power source 100 in the preferred embodiment also includes a controller 104, an auxiliary power controller 105, a cooling fan 110, a front panel 111, and a remote connector 112.

Although particular configurations for the input stage and output stage are shown in the preferred embodiment, the present invention is not limited to these configurations. Input stage, as used herein, includes circuits configured to receive an ac input signal and to provide a dc output signal and may include as part thereof a rectifier, a transformer, a saturable reactor, a converter, an inverter, a filter, and/or a magnetic amplifier. Output stage, as used herein, includes circuits configured to receive an input signal and to provide an output power signal suitable for welding, cutting and/or heating applications. Output stages may include in part, an inverter, a converter, a rectifier, a transformer an output choke, and/or a filter.

Figure 2:
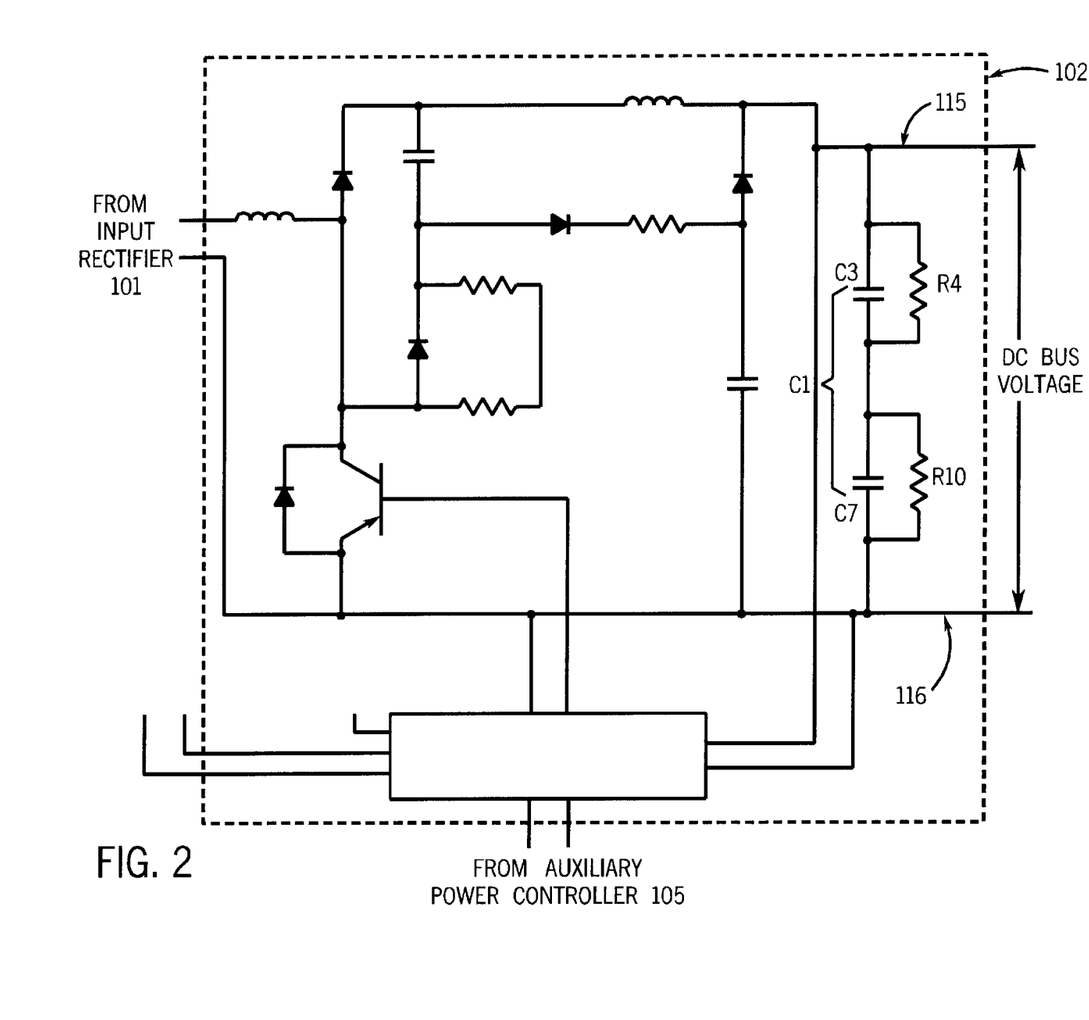
FIG. 2 is a detailed diagram of the boost circuit of FIG. 1.

Referring now to FIG. 2, the details of the preferred embodiment of boost circuit 102 are shown. Among other elements, boost circuit 102 includes a dc bus between lines 115 and 116, a dc bus capacitor C1 consisting of individual capacitors C3 and C7 connected in series, and their associated protective resistors R4 and R10. Although the preferred embodiment of the present invention shows a dc bus capacitor comprising two individual series connected capacitors, the present invention is not limited to this configuration. Bus capacitor, as used herein, includes both a single capacitor connected across the dc bus or any combination of individual capacitors connected in series or parallel across the dc bus.

The overall operation of welding/plasma power source 100, including the operation of boost circuit 102 are well known in the art and are described in U.S. Pat. No. 5,601,741. Briefly, in accordance with the preferred embodiment of the present invention, welding/plasma power source 100 receives an ac input signal from a generator source on input lines 107. The ac input signal from the generator source has a period T (in seconds). The ac input signal is provided to input rectifier 101. Input rectifier 101 rectifies the ac input signal to provide a rectified intermediate signal having a peak voltage. A 10 microfarad capacitor C4 is provided for high frequency decoupling of boost circuit 102 in the preferred embodiment. The decoupled rectified intermediate signal is provided to boost circuit 102.

Boost circuit 102 processes the rectified intermediate signal provided by input rectifier 101 to provide a dc bus signal on lines 115, 116 having a controllable voltage magnitude V (in volts). In the preferred embodiment, the voltage magnitude of the dc bus signal is controlled to be approximately 800 volts, regardless of the input signal voltage from the generator source.

The voltage magnitude of the dc bus signal should be at least greater than the peak voltage of the rectified intermediate signal, preferably at least 10 percent greater. This is provided by the boost circuit in the preferred embodiment. In other embodiments of the present invention, this is provided by a Cuk converter or a SEPIC converter.

The dc bus signal is provided to PWM 103, where the dc bus signal is inverted and pulse-width modulated. The output of PWM 103 is provided to an output transformer T3, which, transforms the output of PWM 103 to provide an available output power P (in watts) which is adequate for welding, plasma cutting and/or induction heating. In the preferred embodiment, the available output power P is approximately equal to 5610 watts.

The available output power P, as that term is used herein, is the product of the current the welding/plasma power source provides during a complete welding (or cutting or heating) operation(e.g. for several minutes) at maximum output current and the conventional load voltage ($U_2$):

Available Output Power $P$=[current provided by the welding/plasma power source (over time) at maximum output current]×[conventional load voltage ($U_2$)]

Conventional load voltage ($U_2$), as that term is used herein, is the voltage having the test value specified in IEC 60974-1 assuming that the conventional welding current ($I_2$) specified in IEC 60974-1 is equal to the maximum current output (over time) of the welding/plasma power source during a complete welding (or cutting or heating) operation. Conventional Welding Current ($I_2$), as that term is used herein, is defined in IEC 60974-1 as the current delivered by a welding power source to a conventional load at the corresponding conventional load voltage.

The conventional load voltage ($U_2$) specified in IEC 60974-1 for various types of welding and cutting applications are as follows:

Plasma cutting:
For $I_2$ up to 300 amps, $U_2$=(80+0.4 $I_2$) volts
For $I_2$ over 300 amps, $U_2$=200 volts
Manual metal arc welding with covered electrodes:
For $I_2$ up to 600 amps, $U_2$=(20+0.04 $I_2$) volts
For $I_2$ over 600 amps, $U_2$=44 volts
Tungsten inert gas and plasma arc welding:
For $I_2$ up to 600 amps, $U_2$=(10+0.04 $I_2$) volts
For $I_2$ over 600 amps, $U_2$=34 volts
Metal inert/active gas and self-shielded flux cored arc welding:
For $I_2$ up to 600 amps, $U_2$=(14+0.05 $I_2$) volts
For $I_2$ over 600 amps, $U_2$32 44 volts
Submerged arc welding:
For $I_2$ up to 600 amps, $U_2$=(20+0.04 $I_2$) volts
For $I_2$ over 600 amps, $U_2$32 44 volts Generally over time, the energy (E) available in a single cycle T of the input signal from the generator source can be expressed in terms of the available power output P from the welding/plasma power source as:

$$E=(P)(T)$$

The power demands made on the generator source by the welding/plasma power source from time to time, however, can result in heavy loading of the generator source. This in turn can result in short term transients (on the order of a cycle T) that reduce the available energy per cycle of the input signal below the amount obtained from the formula above. In the present invention, this energy "shortfall" is overcome by the energy stored in the dc bus capacitor. In the preferred embodiment, dc bus capacitor C1 can store an amount of energy equal to the energy (over time) available in approximately 2.75 cycles of the input signal, or in other words, C1 can store an amount of energy equal to approximately E=2.75(P)(T) joules. By providing for an amount of energy storage equal to that available in approximately 2.75 cycles of the input signal, the welding/plasma power source of the preferred embodiment can overcome the transients that occur in the input power which are only on the order of a cycle T in length.

In alternative embodiments of the present invention, C1 can store an amount of energy at least equal to the energy (over time) available in at least 1.5 cycles of the input signal (or in other words, E=1.5(P)(T)), in at least 2 cycles of the input signal (E=2(P)(T)), or in at least 2.5 cycles of the input signal (E=2.5(P)(T)).

Generally, the energy stored by the energy storage device should be sufficient to maintain the output of a welding/plasma power source, having a dc bus voltage magnitude greater than the peak voltage of the rectified input signal, for the duration of mechanical transients and heavy loading. This in turn should allow the welding/plasma power source, in one embodiment, when run off of a generator source, to provide at least 75 percent of the available output power as compared to when the same welding/plasma power source is run off of a utility source. In two alternative embodiments, the welding/plasma power source is capable of providing 90 and 95 percent comparable power.

The energy storage capacity of dc bus capacitor C1 can be expressed in terms of its capacitance value C and the magnitude of the dc bus voltage V as:

$$E=\tfrac{1}{2}(C)(V^2)$$

Setting this equation equal to the previous equation for the energy available in a single cycle T of the input signal (e.g $E=(P)(T)$) and solving for C yields:

$$C=2(P)(T)/(V^2)$$

This equation represents the capacitance value of dc bus capacitor C1 that will enable C1 to provide an amount of stored energy equal to the energy stored in one cycle T of the input signal from the generator source.

In the preferred embodiment, C1 provides an amount of stored energy equal to the energy available in approximately 2.75 cycles of the input signal or, in other words, the capacitance value of C1 in the preferred embodiment is approximately $C=5.5(P)(T)/(V^2)$.

In other embodiments, capacitor C1 has the capacity to store energy at least equal to the energy available in 1.5 cycles of the input signal (or, in other words, a capacitance value of at least $C=3(P)(T)/(V^2)$), 2 cycles of the input signal (a capacitance value of at least $C=4(P)(T)/(V^2)$), and 2.5 cycles of the input signal (a capacitance value of at least $C=5(P)(T)/(V^2)$).

In the preferred embodiment, the approximate values of P, T, and V are: P=5610 watts, T=16.67 milliseconds, and V=800 volts. This results in a capacitance value for C1 of 800 microfarads in the preferred embodiment (note that individual capacitors C3 and C7 have a capacitance value of 1600 microfarads each). In other embodiments, capacitor C1 has capacitance values of at least 438 microfarads, at least 500 microfarads, at least 583 microfarads and at least 729 microfarads.

It should be understood that all of the alternative embodiments disclosed herein are meant to be only representative examples. The present invention also includes intermittent values that will allow for sufficient energy storage.

Numerous modifications may be made to the present invention which still fall within the intended scope hereof. Thus, it should be apparent that there has been provided in accordance with the present invention a method and apparatus for allowing a welding/plasma power source to be run off of a generator source that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding/plasma power source comprising:
   an input stage configured to receive an ac input signal having a period of T seconds and to rectify the ac input signal to provide a rectified intermediate signal having a peak voltage and further wherein the input stage provides a dc voltage signal having a voltage of V volts across a dc bus, wherein V is greater than the peak voltage of the rectified intermediate signal;
   an output stage disposed to receive the dc voltage signal and configured to provide an available output power signal having a power of P watts; and
   a bus capacitor connected across the dc bus wherein the bus capacitor has a capacitance of at least $(3PT)/(V^2)$ farads.

2. The welding/plasma power source of claim 1 wherein the capacitance is at least $(4PT)/(V^2)$.

3. The welding/plasma power source of claim 1 wherein the capacitance is at least $(5PT)/(V^2)$.

4. The welding/plasma power source of claim 1 wherein the input stage includes an input rectifier configured to receive the ac input signal.

5. The welding/plasma power source of claim 4 wherein the input stage further includes a converter configured to provide the dc voltage signal.

6. The welding/plasma power source of claim 5 wherein the converter is a boost converter.

7. The welding/plasma power source of claim 5 wherein the converter is a buck converter.

8. The welding/plasma power source of claim 1 wherein the input stage includes a converter configured to provide the dc voltage signal.

9. The welding/plasma power source of claim 1 wherein the output stage includes an inverter disposed to receive the dc voltage signal.

10. The welding/plasma power source of claim 9 wherein the inverter is a pulse width modulating inverter.

11. The welding/plasma power source of claim 9 wherein the output stage further includes an output transformer configured to provide the available output power signal.

12. The welding/plasma power source of claim 9 wherein the output stage further includes an output rectifier configured to provide the available output power signal.

13. The welding/plasma power source of claim 1 wherein the output stage includes an output rectifier configured to provide the available output power signal.

14. A welding/plasma power source comprising:
    an input stage configured to receive an ac input signal having a period of T seconds and to rectify the ac input signal to provide a rectified intermediate signal having a peak voltage and further wherein the input stage provides a dc voltage signal having a voltage of V volts across a dc bus, wherein V is greater than the peak voltage of the rectified intermediate signal;
    an output stage disposed to receive the dc voltage signal and configured to provide an available output power signal having a power of P watts; and
    an energy storage device connected to provide stored energy to the dc bus, wherein the energy storage device can store energy of at least $(1.5)(PT)$ joules.

15. The welding/plasma power source of claim 14 wherein the energy storage device can store energy of at least $(2)(PT)$ joules.

16. The welding/plasma power source of claim 14 wherein the energy storage device can store energy of at least $(2.5)(PT)$ joules.

17. A welding/plasma power source comprising:
    an input stage configured to receive an ac input signal and to rectify the ac input signal to provide a rectified intermediate signal having a peak voltage and further wherein the input stage provides a dc voltage signal having a voltage of V volts across a dc bus, wherein V is greater than the peak voltage of the rectified intermediate signal;

an output stage disposed to receive the dc voltage signal and configured to provide an available output power signal; and a bus capacitor connected across the dc bus wherein the bus capacitor has a capacitance of at least 438 microfarads.

18. The welding/plasma power source of claim 17 wherein the capacitance is at least 500 microfarads.

19. The welding/plasma power source of claim 17 wherein the capacitance is at least 583 microfarads.

20. The welding/plasma power source of claim 17 wherein the capacitance is at least 729 microfarads.

21. A welding/plasma power source comprising:

an input stage configured to receive an ac input signal from a utility source and a generator source and further wherein the input stage provides a dc bus signal;

an output stage disposed to receive the dc bus signal and configured to provide an available output power wherein the available output power has a first value when the ac input signal is from the utility source and a second value when the ac input signal is from the generator source and further wherein the second value is at least seventy-five percent of the first value.

22. The welding/plasma power source of claim 21 wherein the second value is at least ninety percent of the first value.

23. The welding/plasma power source of claim 21 wherein the second value is at least ninety-five percent of the first value.

24. A welding/plasma power source comprising:

an input stage configured to receive an ac input signal and to rectify the ac input signal to provide a rectified intermediate signal having a peak voltage and further wherein the input stage provides a dc voltage signal having a voltage of V volts across a dc bus, wherein V is greater than the peak voltage of the rectified intermediate signal;

an output stage disposed to receive the dc voltage signal and configured to provide an available output power signal; and an energy storage device connected to provide stored energy to the dc bus, wherein the energy storage device can store sufficient energy to maintain the available output power signal through the duration of mechanical transients.

25. A welding/plasma power source comprising:

a generator source configured to provide an ac input signal wherein the ac input signal includes at least one mechanical transient;

an input stage configured to receive the ac input signal from the generator source and to rectify the ac input signal to provide a rectified intermediate signal having a peak voltage and further wherein the input stage provides a dc voltage signal having a voltage of V volts across a dc bus, wherein V is greater than the peak voltage of the rectified intermediate signal;

an output stage disposed to receive the dc voltage signal and configured to provide an available output power signal; and an energy storage device connected to provide stored energy to the dc bus, wherein the energy storage device can store sufficient energy to maintain the available output power signal through the duration of the at least one mechanical transient.

26. A method of providing welding/plasma power comprising:

receiving an ac input signal having a period of T seconds;

rectifying the ac input signal to provide a rectified intermediate signal having a peak voltage;

providing a dc voltage signal having a voltage of V volts across a dc bus, wherein V is greater than the peak voltage of the rectified intermediate signal;

receiving the dc voltage signal;

providing an available output power signal having a power of P watts; and providing a capacitance of at least $(3PT)/(V^2)$ farads across the dc bus.

27. The method of claim 26 wherein the capacitance is at least $(4PT)/(V^2)$.

28. The method of claim 26 wherein the capacitance is at least $(5PT)/(V^2)$.

29. A method of providing welding/plasma power comprising:

receiving an ac input signal having a period of T seconds;

rectifying the ac input signal to provide a rectified intermediate signal having a peak voltage;

providing a dc voltage signal having a voltage of V volts across a dc bus, wherein V is greater than the peak voltage of the rectified intermediate signal;

receiving the dc voltage signal;

providing an available output power signal having a power of P watts; and providing stored energy to the dc bus from an energy storage device capable of storing at least $(1.5)(PT)$ joules of energy.

30. The method of claim 29 wherein the energy storage device can store energy of at least $(2)(PT)$ joules.

31. The method of claim 29 wherein the energy storage device can store energy of at least $(2.5)(PT)$ joules.

32. A method of providing welding/plasma power comprising:

receiving an ac input signal;

rectifying the ac input signal to provide a rectified intermediate signal having a peak voltage;

providing a dc voltage signal having a voltage of V volts across a dc bus, wherein V is greater than the peak voltage of the rectified intermediate signal;

receiving the dc voltage signal;

providing an available output power signal; and providing capacitance of at least 438 microfarads across the dc bus.

33. The method of claim 32 wherein the capacitance is at least 500 microfarads.

34. The method of claim 32 wherein the capacitance is at least 583 microfarads.

35. The method of claim 32 wherein the capacitance is at least 729 microfarads.

36. A method of providing welding/plasma power comprising:

receiving an ac input signal from at least one of a utility source and a generator source;

providing a dc bus signal;

receiving the da bus signal;

providing an available output power wherein the available output power has a first value when the ac input signal is from the utility source and a second value when the ac input signal is from the generator source and further wherein the second value is at least seventy-five percent of the first value.

37. The method of claim 36 wherein the second value is at least ninety percent of the first value.

38. The method of claim 36 wherein the second value is at least ninety-five percent of the first value.

39. A method of providing welding/plasma power comprising:

receiving an ac input signal;

rectifying the ac input signal to provide a rectified intermediate signal having a peak voltage;

providing a dc voltage signal having a voltage of V volts across a dc bus, wherein V is greater than the peak voltage of the rectified intermediate signal;

receiving the dc voltage signal;

providing an available output power signal; and providing stored energy to the dc bus from an energy storage device capable of storing sufficient energy to maintain the available output power signal through the duration of mechanical transients.

40. A method of providing welding/plasma power comprising:

providing an ac input signal from a generator source wherein the ac input signal includes at least one mechanical transient;

receiving the ac input signal;

rectifying the ac input signal to provide a rectified intermediate signal having a peak voltage;

providing a dc voltage signal having a voltage of V volts across a dc bus, wherein V is greater than the peak voltage of the rectified intermediate signal;

receiving the dc voltage signal;

providing an available output power signal; and providing stored energy to the dc bus from an energy storage device capable of storing sufficient energy to maintain the available output power signal through the duration of the at least one mechanical transient.

* * * * *

(12) EX PARTE REEXAMINATION CERTIFICATE (6852nd)
United States Patent
Ulrich (10) Number: US 6,236,014 C1
(45) Certificate Issued: Jun. 2, 2009

(54) METHOD AND APPARATUS FOR PROVIDING WELDING/PLASMA POWER

(75) Inventor: James F. Ulrich, Hortonville, WI (US)

(73) Assignee: Illinois Tool Works Inc., Glenview, IL (US)

Reexamination Request:
No. 90/007,848, Dec. 13, 2005

Reexamination Certificate for:
Patent No.: 6,236,014
Issued: May 22, 2001
Appl. No.: 09/466,955
Filed: Dec. 20, 1999

(51) Int. Cl.
*B23K 10/00* (2006.01)

(52) U.S. Cl. .................. 219/121.57; 219/121.45; 219/121.54; 219/130.21; 363/142

(58) Field of Classification Search ............ 219/121.57, 219/121.54, 121.45–121.49, 130.21; 363/142
See application file for complete search history.

(56) References Cited

U.S. PATENT DOCUMENTS

| | | |
|---|---|---|
| 3,988,566 A | 10/1976 | Vogts et al. |
| 4,088,937 A | 5/1978 | Uchida et al. |
| 4,146,772 A | 3/1979 | Jelmorini |
| 4,156,125 A | 5/1979 | Brown |
| 4,410,792 A | 10/1983 | Komura et al. |
| 4,415,964 A | 11/1983 | Scharfe, Jr. |
| 4,476,373 A | 10/1984 | D'Antonio |
| 4,561,059 A | 12/1985 | Davis et al. |
| 4,595,820 A | 6/1986 | Richardson |
| 4,678,888 A | 7/1987 | Camacho et al. |
| 4,695,938 A | 9/1987 | Tada |
| 4,716,274 A | 12/1987 | Gilliland |
| 4,766,286 A | 8/1988 | Iceland |
| 4,766,287 A | 8/1988 | Morrisroe et al. |
| 4,785,149 A | 11/1988 | Gilliland |
| 4,788,409 A | 11/1988 | Yamade et al. |
| 4,821,202 A | 4/1989 | Davis et al. |
| 4,839,499 A | 6/1989 | Kotecki et al. |
| 4,901,720 A | 2/1990 | Bertrand |
| 4,918,283 A | 4/1990 | Yamade et al. |
| 4,929,811 A | 5/1990 | Blankenship |
| 4,935,596 A | 6/1990 | Gagne |
| 4,996,407 A | 2/1991 | Traxler |
| 5,001,326 A | 3/1991 | Stava |
| 5,025,135 A | 6/1991 | Gesche et al. |
| 5,057,665 A | 10/1991 | Gilliland |
| 5,086,205 A | 2/1992 | Thommes et al. |
| 5,111,024 A | 5/1992 | Walters et al. |

(Continued)

FOREIGN PATENT DOCUMENTS

DE          42 11 906 C1      6/1993

OTHER PUBLICATIONS

Optimizing the Design of a High Power Factor Switching Preregulator By: Lloyd Dixon.

Dixon, Lloyd, "*Optimizing the Design of a High Power Factor Switching Preregulator*"; Unitrode Publication SEM700 (presumed publication date: 1990).

Dixon, Lloyd, *High Power Factor Preregulators for Off–Line Power Supplies*; Unitrode Power Supply Design Seminar Manual SEM600, 1988 (Republished in subsequent Manuals).

(Continued)

*Primary Examiner*—Matthew C. Graham (57) ABSTRACT

A method and apparatus for providing welding/plasma power is disclosed. The welding/plasma power source includes an input stage, an output stage, and an energy storage device such as a capacitor. The input stage is configured to receive an ac input signal and to rectify the ac input signal to provide a rectified intermediate signal. The input stage is further configured to provide a dc voltage signal across a dc bus. The output stage is disposed to receive the dc voltage signal and is configured to provide an available output power signal suitable for welding, plasma cutting and induction heating applications. The energy storage device is connected to provide sufficient stored energy to the dc bus to allow the welding/plasma power source to run off of a generator.

U.S. PATENT DOCUMENTS

| | | | |
|---|---|---|---|
| 5,149,940 | A | 9/1992 | Davis et al. |
| 5,241,152 | A | 8/1993 | Anderson et al. |
| 5,272,313 | A | 12/1993 | Karino et al. |
| 5,296,667 | A | 3/1994 | Marantz et al. |
| 5,310,992 | A | 5/1994 | Karino et al. |
| 5,352,861 | A | 10/1994 | Steigerwald et al. |
| 5,359,180 | A | 10/1994 | Park et al. |
| 5,416,297 | A | 5/1995 | Luo et al. |
| 5,444,356 | A | 8/1995 | Reynolds et al. |
| 5,528,010 | A | 6/1996 | Herwig et al. |
| 5,530,220 | A | 6/1996 | Tatham |
| 5,548,097 | A | 8/1996 | Couch et al. |
| 5,601,741 | A | 2/1997 | Thommes |
| 5,620,617 | A | 4/1997 | Borowy et al. |
| 5,630,952 | A | 5/1997 | Karino et al. |
| 5,643,475 | A | 7/1997 | Karino et al. |
| 5,660,745 | A | 8/1997 | Naor |
| 5,740,026 | A | 4/1998 | Karol |
| 5,756,963 | A | 5/1998 | Higgins |
| 5,798,497 | A | 8/1998 | Titus et al. |
| 5,824,990 | A | 10/1998 | Geissler et al. |
| 5,828,030 | A | 10/1998 | Naor |
| 5,831,237 | A | 11/1998 | Daniel |
| 5,844,197 | A | 12/1998 | Daniel |
| 5,864,110 | A | 1/1999 | Moriguchi et al. |
| 5,900,169 | A | 5/1999 | Borowy et al. |
| 5,920,467 | A | 7/1999 | Bowyer et al. |
| 5,932,116 | A | 8/1999 | Matsumoto et al. |
| 5,982,652 | A | 11/1999 | Simonelli et al. |
| 5,990,443 | A | 11/1999 | Tatham et al. |
| 6,002,103 | A | 12/1999 | Thommes |
| 6,002,604 | A | 12/1999 | Chan et al. |
| 6,329,636 | B1 | 12/2001 | Geissler |

OTHER PUBLICATIONS

Andreycak, Bill, *Power Factor Correction Using the UC3852 Controlled On–Time Zero Current Switching Technique;* Unitrode Application No. U–132 (presumed publication date: 1997).

Todd, Philip C., *UC3854 Controlled Power Factor Correction Circuit Design;* Unitrode Application Note U–134 (presumed publication date: 1997).

Zendzian, Dave, *A High Performance Linear Regulator for Low Dropout Applications;* Unitrode Corporation U–152; (presumed publication date: 1997).

Todd, Philip C., *Boost Power Factor Corrector Design with the UC3853,* Unitrode Corporation U–159; (presumed publication date: 1997).

Panov, Y.V. et al., *Design Issues for a Zero–Voltage–Switched Power Factor Correction Circuit and DC/DC Converter Power Processing Unit;* Proceedings of the Virginia Power Electronics Seminar (VPEC) 1993; Blacksburg, VA, Sep. 19–21, 1983; pp. 213–224.

Jiang, Y.M. et al., *A Novel Single–Phase Power Factor Correction Scheme,* Proceedings of the Applied Power Electronics Conference; San Diego, CA, Mar. 7–11, 1993; pp. 287–292.

Jiang, Y. et al., *Single–Stage Single–Phase Parallel Power Factor Correction Scheme;* Proceedings of the Power Electronics Specialist Conference, Taipei, Taiwan, Jun. 20–25, 1994.

Boylestad, *Introductory Circuit Analysis,* Charles E. Merrill Publishing Company, Columbus, Ohio, Second Edition, 1972, p. 67.

Bernard Grob, *Basic Electronics;* McGraw–Hill Book Company, New York, Sixth Edition, 1989, p. 69.

Waterville Senior High School Web Page located at Waterville, Maine, i.e., (http://wshs.wtvl.k12.me.us/~zmunson/EM8.htm).

Bernard Grob, *Basic Electronics,* McGraw–Hill Book Company, New York, Sixth Edition, 1989, p. 487.

Website for the Department of Physics at the University of Maryland (http://www.physics.umd.edu/lecdem/outreach/QOTW/arch6/a110.htm) located at Waterville, Maine.

Boylestad, *Introductory Circuit Analysis;* Charles E. Merrill Publishing Company, Columbus, Ohio, Second Edition, 1972, p. 577.

EX PARTE REEXAMINATION CERTIFICATE ISSUED UNDER 35 U.S.C. 307

THE PATENT IS HEREBY AMENDED AS INDICATED BELOW

AS A RESULT OF REEXAMINATION, IT HAS BEEN DETERMINED THAT:

The patentability of claims 1–16 and 26–31 is confirmed.

Claims 17–25 and 32–40 are cancelled.

* * * * *